Patented Aug. 19, 1924.

1,505,496

UNITED STATES PATENT OFFICE.

KARL ROHDE, OF BERLIN-CHARLOTTENBURG, GERMANY, ASSIGNOR TO CHEMISCHE FABRIK AUF ACTIEN (VORM. E. SCHERING), OF BERLIN, GERMANY.

PROCESS OF MANUFACTURING ACTIVE CARBON.

No Drawing. Application filed April 12, 1921. Serial No. 460,851.

*To all whom it may concern:*

Be it known that I, KARL ROHDE, citizen of Germany, residing at Berlin-Charlottenburg, Germany, have invented a new and useful Improvement in Processes of Manufacturing Active Carbon (for which I have filed application in Germany, dated July 9, 1918), of which the following is a specification.

This invention relates to processes of producing active carbon and the objects of the invention are to produce a carbon of exceptionally high activity from carbonaceous material of fossil origin, such as brown coal, peat, or their coking products.

I have found out that a carbon of high activity can be produced by impregnating carbonaceous material of fossil origin such as brown coal, peat or their coking products with alkalies, preferably with alkali carbonates, and by then heating the mass to a high temperature, for instance to about 1000° centigrade and more. For the production of highly active carbon the heating to such high temperature is necessary. In case the use to which the carbon is to be put makes it necessary, the carbon can then be washed, for removing the alkali, and afterwards dried. There results a carbon which for instance is excellently qualified for clarifying and deodorizing purposes, as well as for the absorption of gases.

I proceed for instance as follows:

Brown coal, peat or their coking products are impregnated with approximately a 50 per cent solution of potassium carbonate by thoroughly saturating the material with the solution. The impregnated material is then dried, preferably while the same is stirred and at a temperature of approximately 150 degrees centigrade, and the dried mass is then heated to about 1000 degrees centigrade and more, air being excluded from the material during the heating thereof. The heating of the material to this temperature renders the same unusually active. If the use to which the active carbon is to be put makes it necessary or desirable, the alkali is then washed out thoroughly and the carbon dried. If for any reason all traces of alkali must be removed, the material may be finally washed by means of a diluted acid solution, and then again with water.

The potassium carbonate can be replaced by potassium hydroxide and the potassium compounds by the respective sodium compounds, and it will be understood that the term "alkali" is intended to include alkali carbonates.

It may be desirable in some cases to evacuate the material prior to adding the impregnating substance to the same, to cause the alkali to more readily penetrate the carbonaceous material for the purpose of producing as uniform distribution of the alkali through the material as is possible. If desired, the coal may be subjected to pressure after the addition of the alkali so as to thoroughly impregnate the same. The material is then rendered active by raising the same to a temperature of approximately 1000° C., as described.

I claim as my invention:

1. Process of manufacturing active carbon, consisting in impregnating a carbonaceous material of fossil origin with alkali and heating the mass to a temperature of approximately 1000° C. with the exclusion of air.

2. Process of manufacturing active carbon, consisting in impregnating a carbonaceous material of fossil origin with alkali, heating the mass to a temperature of approximately 1000° C. with the exclusion of air, washing out the alkali, and drying the material.

3. Process of manufacturing active carbon, consisting in evacuating carbonaceous material of fossil origin, then impregnating the mass with alkali, placing it under greater than atmospheric pressure and heating to a temperature of approximately 1000° C.

4. Process of manufacturing active carbon from a carbonaceous material of fossil origin, consisting in evacuating the material, then impregnating the coal with alkali, placing the mass under greater than atmospheric pressure and heating the same to a temperature of approximately 1000° C., washing out the alkali, and drying the material.

5. Process of manufacturing active carbon from carbonaceous material of fossil origin, consisting in impregnating the material with alkali containing potassium, heating the mass to a temperature of at least about 1000° centigrade, washing out the alkali, and drying the material.

6. Process of manufacturing active carbon, consisting in impregnating carbonaceous material of fossil origin with a solution of about 50 per cent of potassium carbonate, heating the mass to a temperature of at least about 1000° centigrade, washing out the potassium carbonate, and drying the material.

In testimony whereof I have hereunto set my signature in the presence of two subscribing witnesses.

KARL ROHDE.

Witnesses:
BRINDOLF PEDRO MOHR,
JULIUS FRANCKE.